US011096246B2

(12) United States Patent
Miyamoto et al.

(10) Patent No.: US 11,096,246 B2
(45) Date of Patent: Aug. 17, 2021

(54) RADIO COMMUNICATION SYSTEM AND RADIO COMMUNICATION METHOD (71) Applicant: NIPPON TELEGRAPH AND TELEPHONE CORPORATION, Tokyo (JP)

(72) Inventors: Kenji Miyamoto, Yokosuka (JP); Jun Terada, Yokosuka (JP); Tatsuya Shimizu, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 114 days.

(21) Appl. No.: 16/348,462

(22) PCT Filed: Nov. 6, 2017

(86) PCT No.: PCT/JP2017/039891
§ 371 (c)(1),
(2) Date: May 8, 2019

(87) PCT Pub. No.: WO2018/088348
PCT Pub. Date: May 17, 2018

(65) Prior Publication Data
US 2020/0068659 A1 Feb. 27, 2020

(30) Foreign Application Priority Data

Nov. 11, 2016 (JP) ............................. JP2016-220516

(51) Int. Cl.
*H04B 7/022* (2017.01)
*H04B 7/024* (2017.01)
(Continued)

(52) U.S. Cl.
CPC ............. *H04W 88/08* (2013.01); *H04L 1/005* (2013.01); *H04L 5/10* (2013.01); *H04L 25/0202* (2013.01); *H04L 25/067* (2013.01); *H04W 28/04* (2013.01)

(58) Field of Classification Search
CPC ....... H04B 7/024; H04B 7/0888; H04L 1/005; H04L 5/10; H04L 25/0202; H04L 25/067; (Continued)

(56) References Cited

U.S. PATENT DOCUMENTS 7,953,049 B2 * 5/2011 Nilsson ................. H04L 5/1484
370/336
8,040,987 B2 * 10/2011 Oh ....................... H04L 25/0228
375/349
(Continued)

FOREIGN PATENT DOCUMENTS

JP 2006-197261 A 7/2006

OTHER PUBLICATIONS

Yasuhiko Matsunaga, Radio Access Network Architecture Evolution toward 5G, IEICE Technical Report, vol. 114, No. 254, RCS2014-172, pp. 89-94, Oct. 2014.
(Continued)

*Primary Examiner* — Alpus Hsu
(74) *Attorney, Agent, or Firm* — Harness, Dickey & Pierce, P.L.C.

(57) ABSTRACT

A radio communication system includes a radio apparatus and a signal processing apparatus that function as a base station, and the radio apparatus includes a channel estimation unit that, on the basis of a radio signal transmitted from a terminal apparatus, estimates channel information relating to a radio transmission path between the radio apparatus and the terminal apparatus; a demodulation unit that performs soft-decision demodulation of the radio signal on the basis
(Continued)

of the channel information estimated by the channel estimation unit; a decoding unit that decodes a log likelihood ratio obtained by the soft-decision demodulation and outputs a result of an error detection code obtained by the decoding; and a transmission control unit that, on the basis of the error detection code result, controls transmission, to the signal processing apparatus, of data obtained by the decoding.

7 Claims, 6 Drawing Sheets

(51) Int. Cl.
| | |
|---|---|
| *H04B 7/08* | (2006.01) |
| *H04L 27/00* | (2006.01) |
| *H04W 28/04* | (2009.01) |
| *H04W 88/08* | (2009.01) |
| *H04W 92/12* | (2009.01) |
| *H04L 1/00* | (2006.01) |
| *H04L 5/10* | (2006.01) |
| *H04L 25/02* | (2006.01) |
| *H04L 25/06* | (2006.01) |

(58) Field of Classification Search
CPC ... H04W 28/04; H04W 88/08; H04W 88/085; H04W 92/12
See application file for complete search history.

(56) References Cited

U.S. PATENT DOCUMENTS

| | | | | |
|---|---|---|---|---|
| 8,429,475 | B2* | 4/2013 | Duggan | H04L 1/1829 |
| | | | | 714/748 |
| 8,781,016 | B2* | 7/2014 | Yonge, III | H04L 25/0232 |
| | | | | 375/267 |
| 8,831,134 | B2* | 9/2014 | Murakami | H04L 27/22 |
| | | | | 375/296 |
| 9,713,123 | B2* | 7/2017 | Yoshimoto | H04W 72/005 |
| 2007/0217388 | A1* | 9/2007 | Shiizaki | H04L 1/0031 |
| | | | | 370/349 |
| 2009/0213955 | A1* | 8/2009 | Higuchi | H04L 1/0643 |
| | | | | 375/267 |
| 2012/0281554 | A1* | 11/2012 | Gao | H04L 5/0053 |
| | | | | 370/252 |
| 2014/0355531 | A1* | 12/2014 | Han | H04L 1/0072 |
| | | | | 370/329 |
| 2016/0330789 | A1* | 11/2016 | Goto | H04W 76/27 |

OTHER PUBLICATIONS

Hidekazu Taoka et al., MIMO and CoMP in LTE-Advanced, NTT DOCOMO Technical Journal, 2010. vol. 18, No. 2, pp. 22-30.

Kazuhiko Fukawa, IEICE, "Knowledge Base", 4 groups (mobile, wireless), vol. 1, No. 6, pp. 1-9, Nov. 2010.

Naotaka Shibata et al., A Study of Uplink Throughput in Base Station Architecture Splitting LTE Physical Layer Functions, Proceedings 1 of communication society in conference of IEICE, 2015, p. 291, B-5-29.

International Search Report (English and Japanese) issued in International Application No. PCT/JP2017/039891, dated Jan. 9, 2018; ISA/JP.

Annavajjala, Ramesh, "Low-Complexity Distributed Algorithms for Uplink CoMP in Heterogeneous LTE Networks", Journal Of Communications And Networks, New York, NY, USA, IEEE. vol. 18, No. 2, Apr. 1, 2016, pp. 150-161, XP011613123, ISSN: 1229-2370, DOI: 10.1109/JCN.2016.000024 [retrieved on Jun. 8, 2016].

Huo, Qiang et al., "Selective Combining For Hybrid Cooperative Networks", arxiv.org, Cornell University Library. 201 OLIN Library Cornell Univeristy, Ithaca, NY 14853, Jan. 4, 2014, XP080000378, DOI: 10.1049/IET-COM.2013.0323.

Bao, Xingkai et al., "Efficient Message Relaying For Wireless User Cooperation: Decode-Amplify-Forward (DAF) and Hybrid DAF and Coded-Cooperation", IEEE Transactions On Wireless Communications, IEEE Service Center, Piscataway, NJ, US, vol. 6, No. 11, Nov. 1, 2007, pp. 3975-3984. XP011197008, ISSN: 1536-1276, DOI: 10.1109/TWC.2007.06117.

Extended European Search Report from counterpart EP178699021, dated Mar. 27, 2020.

Kong, Dan et al., "Multiuser Detection Algorithm for PDMA Uplink System Based on SIC and MMSE", 2016 IEEE/CIC International Conference on Communications in China (ICCC), IEEE, Jul. 27, 2016, pp. 1-5.

\* cited by examiner

Prior Art

FIG. 6

Prior Art

FIG. 7

Prior Art

RADIO COMMUNICATION SYSTEM AND RADIO COMMUNICATION METHOD

CROSS-REFERENCE TO RELATED APPLICATIONS

This application is a 371 U.S. National State of International Application No. PCT/JP2017/039891, filed on Nov. 6, 2017, which claims priority to Japanese Application No. 2016-220516, filed on Nov. 11, 2016. The entire disclosures of the above applications are incorporated herein by reference.

TECHNICAL FIELD

The present invention relates to a radio communication system and a radio communication method.

BACKGROUND ART

Figure 5:
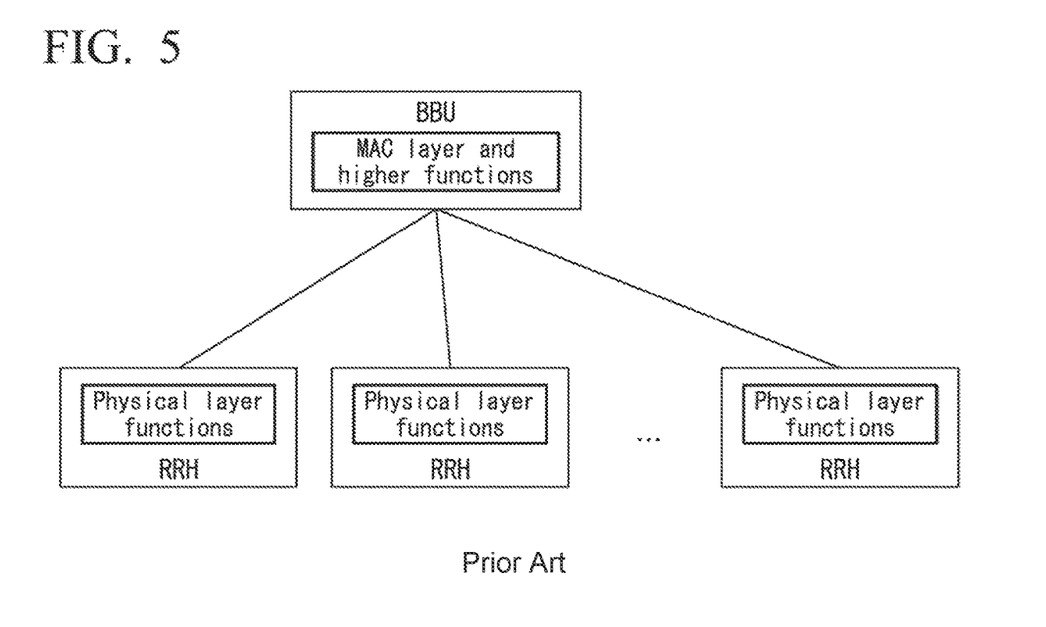
FIG. 5 is a diagram showing an example of a MAC-PHY split functional splitting scheme.

Conventionally, in order to raise the flexibility of base station installation in radio communication systems, particularly mobile communication systems, configurations in which the functions of a base station are distributed between two apparatuses, namely, a BBU (Base Band Unit) and an RRH (Remote Radio Head), and the BBU and RRH are physically separated, have been considered. As one mode for functional splitting schemes between a BBU and an RRH, a functional splitting scheme in which the functions of the MAC (Media Access Control) layer and higher are performed by a BBU and the functions of the physical layer are performed by RRHs, as shown in FIG. 5, has been considered (see, e.g., Non-Patent Document 1). This functional splitting scheme is called a MAC-PHY splitting scheme or an L2 C-RAN (Layer 2 Centralized/Cloud-Radio Access Network) scheme.

Additionally, in a mobile communication system, the area covered by a single RRH is referred to as a cell, and in general, the coverage areas of multiple adjacent cells overlap. For this reason, when a terminal apparatus is located near a cell edge, there is a problem in that the radio signals being exchanged between the terminal apparatus and a desired RRH can encounter interference from radio signals exchanged between the terminal apparatus and the RRH of an adjacent cell, thereby significantly reducing the radio transmission rate. As a means for solving such a problem, CoMP (Coordinated Multi-Point transmission/reception) technology, in which adjacent RRHs cooperate with each other to communicate with a terminal apparatus located near the cell edges, as shown, for example, in FIG. 6, has been considered (see, e.g., Non-Patent Document 2).

Figure 6:
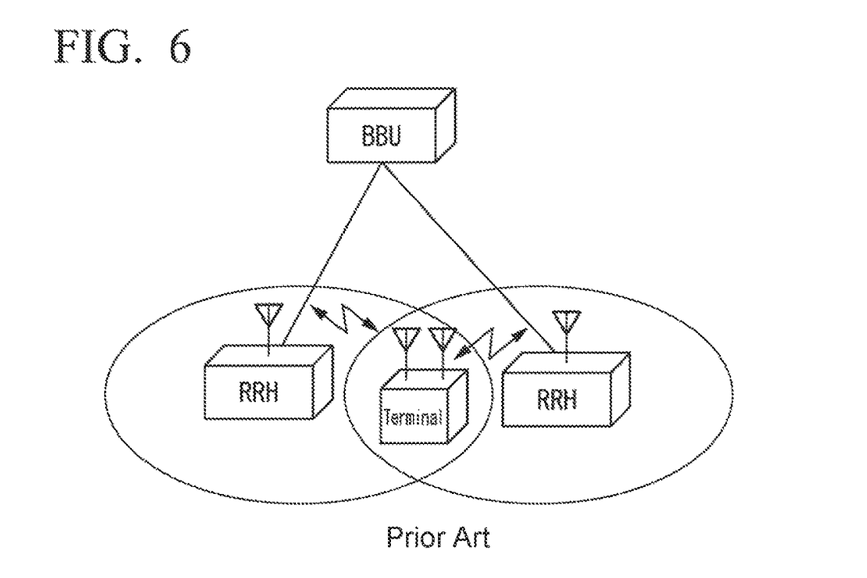
FIG. 6 is a diagram showing a system configuration using CoMP technology.

In FIG. 6, there are two cooperating RRHs, but there may be two or more RRHs. The possibility of installing RRHs at a high density and having multiple RRHs constantly performing CoMP with respect to multiple terminal apparatuses, regardless of whether or not the terminal apparatuses are located at the cell edges, thereby increasing the system capacity, has been considered for use in future mobile communication systems. CoMP techniques includes a technique known as selective combining, in which, among the reception signals from the multiple cooperating RRHs, the reception signal having the highest reception quality is selected (see, e.g., Non-Patent Document 3). In this case, the reception quality refers, for example, to the received signal power, the received SNR (Signal to Noise Ratio), or the received SINR (Signal to Interference plus Noise Ratio). This selective combining may be applied to CoMP in BBUs and RRHs using a MAC-PHY split functional splitting scheme.

Figure 7:
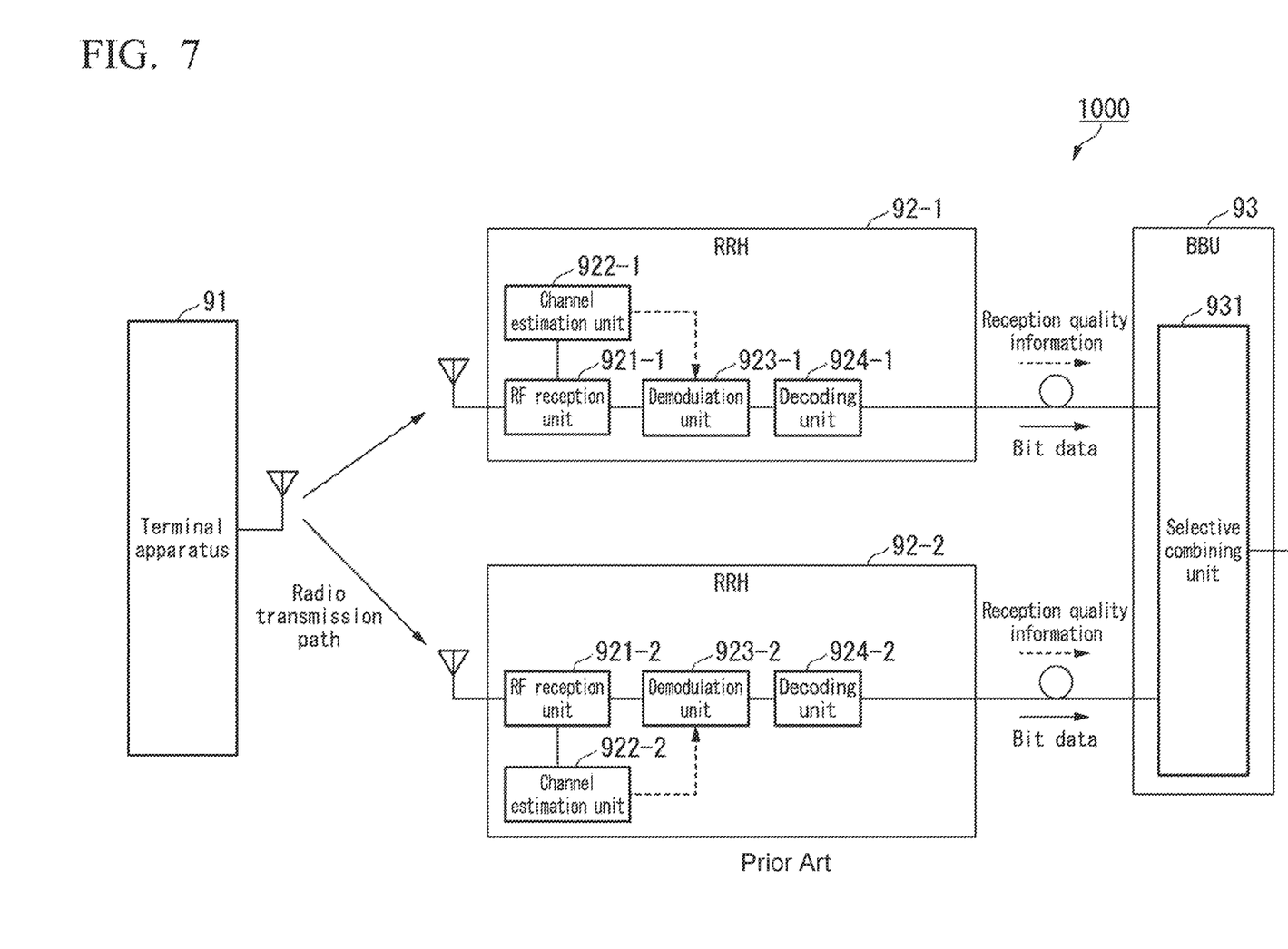
FIG. 7 is a diagram showing an example of a system configuration of a radio communication system that performs uplink selectively combined signal transmission in a conventional MAC-PHY split.

FIG. 7 is a diagram showing an example of a system configuration of a radio communication system 1000 that performs uplink selectively combined signal transmission with a conventional MAC-PHY split. The radio communication system 1000 includes a terminal apparatus 91, multiple RRHs 92-1 and 92-2, and a BBU 93. The RRHs 92-1 and the 92-2 are provided with similar structures, so the RRH 92-1 will be explained as an example.

The RRH 92-1 includes an RF (Radio Frequency) reception unit 921-1, a channel estimation unit 922-1, a demodulation unit 923-1, and a decoding unit 924-1. The BBU 93 includes a selective combining unit 931.

The RF reception unit 921-1 receives signals transmitted from the terminal apparatus 91. Of the received signals, the RF reception unit 921-1 outputs reference signals to the channel estimation unit 922-1, and outputs data signals to the demodulation unit 923-1. The reference signals are signals for extracting channel information regarding the radio transmission path, and include signals that are known between the terminal apparatus and the RRHs. The data signals are signals that are to be transmitted to the BBU, including a series of signal bits.

The channel estimation unit 922-1 estimates the channel information and measures the reception quality on the radio transmission path on the basis of the reference signals output from the RF reception unit 921-1. The channel estimation unit 922-1 outputs the channel information estimation result and the reception quality measurement result to the demodulation unit 923-1. The demodulation unit 923-1 uses the channel information estimation result and the reception quality measurement result output from the channel estimation unit 922-1 to obtain LLR (Log Likelihood Ratio) values (soft decision values) by performing equalization and soft-decision demodulation on the received data signals. The demodulation unit 923-1 outputs the obtained LLR values (soft decision values) and the reception quality measurement result (information on the reception quality) to the decoding unit 924-1.

The decoding unit 924-1 decodes the LLR values output from the demodulation unit 923-1 to restore bit data (hard decision values). It is to be noted that during this decoding step, an error detection code called a CRC (Cyclic Redundancy Check) is used to determine whether or not errors are included in the decoded bit data. Each RRH 92 transmits the decoded bit data and the information on the reception quality (hereinafter referred to as "reception quality information") measured by the channel estimation unit 922 to the BBU 93.

The selective combining unit 931 of the BBU 93 compares the reception quality information transmitted from each RRH 92, selects the bit data of the RRH 92 having the higher reception quality, and discards the bit data transmitted from the other RRH 92.

PRIOR ART DOCUMENTS

Non-Patent Documents

Non-Patent Document 1: Yasuhiko MATSUNAGA, "Radio Access Network Architecture Evolution toward 5G", IEICE Technical Report, vol. 114, no. 254, RCS2014-172, pp. 89-94, October 2014
Non-Patent Document 2: Hidekazu TAOKA et al., "MIMO and Coordinated Multipoint Transmission/Reception Technology in LTE-Advanced", NTT DOCOMO Technical Journal, vol. 18, no. 2, pp. 22-30.

Non-Patent Document 3: Institute of Electronics, Information and Communication Engineers "Knowledge Base", Group 4 (mobile/radio)—Part 1, Chapter 6, pp. 1-9, November 2010

SUMMARY OF INVENTION

Problems to be Solved by the Invention

For cases in which there are multiple RRHs 92 constantly performing CoMP with respect to multiple terminal apparatuses regardless of whether or not the terminal apparatuses are located at cell edges, in conventional uplink selective combining techniques with a MAC-PHY split, decoded bit data is transmitted from all cooperating RRHs 92 to the BBU 93. Nevertheless, in the BBU 93, only the bit data having the highest reception quality is selected from among the bit data transmitted from all of the cooperating RRHs 92. In such conventional uplink selective combining techniques with a MAC-PHY split, there was a problem in that the total transmission data volume between the multiple RRHs and the BBU is made unnecessarily large.

In view of the abovementioned circumstances, the present invention has the purpose of providing a technology that can reduce the total transmission data volume between multiple RRHs and a BBU.

Means for Solving the Problems

An aspect of the present invention is a radio communication system including a radio apparatus and a signal processing apparatus that function as a base station, the radio apparatus including: a channel estimation unit that, on the basis of a radio signal transmitted from a terminal apparatus, estimates channel information relating to a radio transmission path between the radio apparatus and the terminal apparatus; a demodulation unit that performs soft-decision demodulation of the radio signal on the basis of the channel information estimated by the channel estimation unit; a decoding unit that decodes a log likelihood ratio obtained by the soft-decision demodulation and outputs a result of an error detection code obtained by the decoding; and a transmission control unit that, on the basis of the result of the error detection code, controls transmission, to the signal processing apparatus, of data obtained by the decoding.

In the above-mentioned radio communication system, the transmission control unit may, when the result of the error detection code indicates that there is an error, discard the data without transmission to the signal processing apparatus, and when the result of the error detection code indicates that there is no error, transmit the data to the signal processing apparatus.

In the above-mentioned radio communication system, the signal processing apparatus may include a selective combining unit that receives the data transmitted from the radio apparatus, and when a single set of data has been received, selects the data, and when multiple sets of data have been received, selects one of the multiple sets of data in accordance with predetermined conditions.

In the above-mentioned radio communication system, the transmission control unit, when the result of the error detection code indicates that there is an error, may discard the data without transmission to the signal processing apparatus, and notify the signal processing apparatus that the data will not be transmitted to the signal processing apparatus.

In the above-mentioned radio communication system, the selective combining unit may, when multiple sets of data have been received, select the first-received set of data and discard the other sets of data.

An aspect of the present invention is a radio communication method in a radio communication system including a radio apparatus and a signal processing apparatus that function as a base station, the radio communication method including a channel estimation step wherein the radio apparatus, on the basis of a radio signal transmitted from a terminal apparatus, estimates channel information relating to a radio transmission path between the radio apparatus and the terminal apparatus; a demodulation step wherein the radio apparatus performs soft-decision demodulation of the radio signal on the basis of the channel information estimated in the channel estimation step; a decoding step wherein the radio apparatus decodes a log likelihood ratio obtained by the soft-decision demodulation and outputs a result of an error detection code obtained by the decoding; and a transmission control step wherein the radio apparatus, on the basis of the result of the error detection code, controls transmission, to the signal processing apparatus, of data obtained by the decoding.

Advantageous Effect of the Invention

With the present invention, it becomes possible to reduce the total transmission data volume between multiple RRHs and a BBU.

MODES FOR CARRYING OUT THE INVENTION

Hereinbelow, embodiments of the present invention will be explained with reference to the drawings.

First Embodiment

Figure 1:
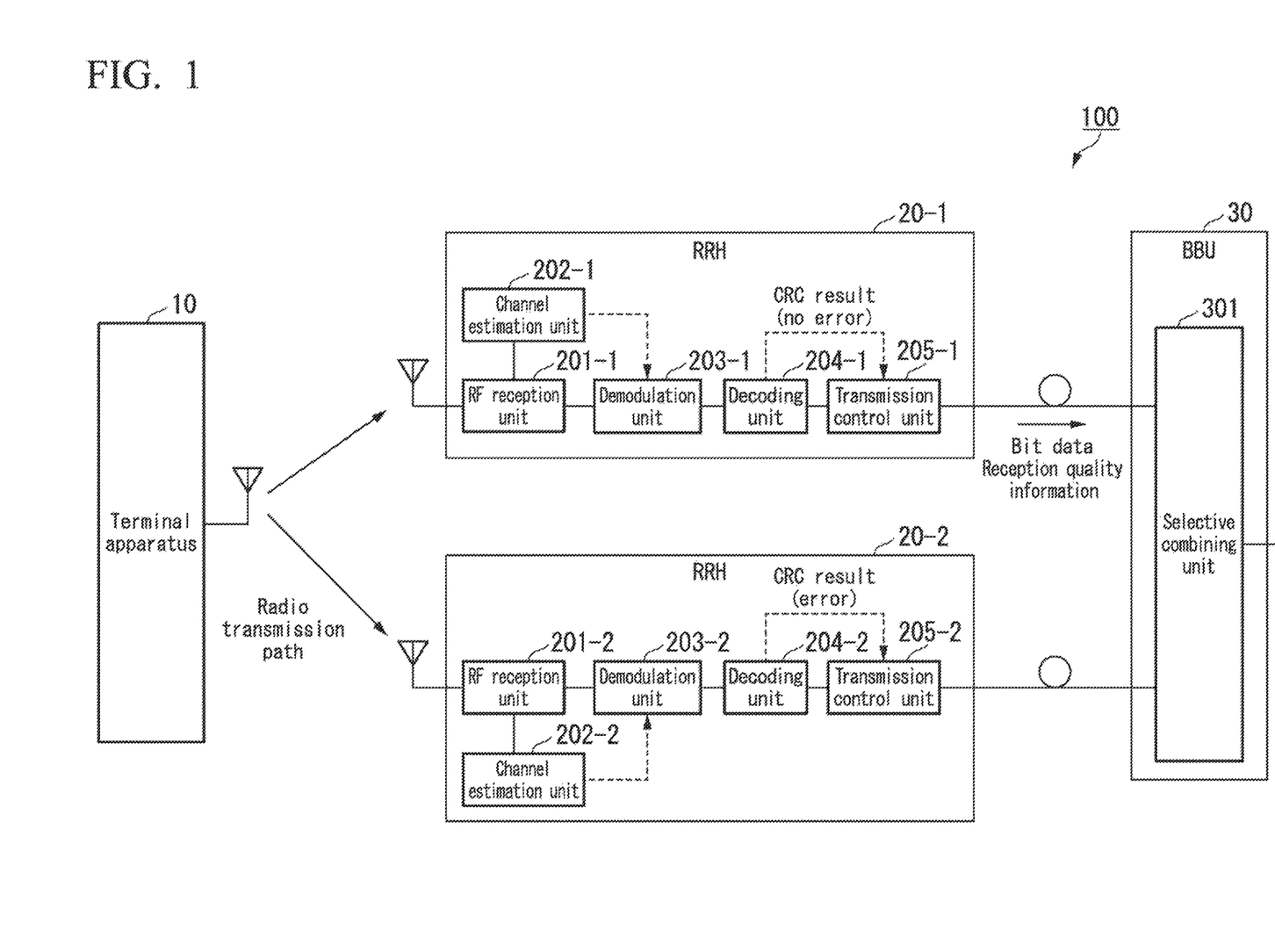
FIG. 1 is a configuration diagram showing the system configuration of a radio communication system 100 according to a first embodiment.

FIG. 1 is a configuration diagram showing a system configuration of a radio communication system 100 according to the first embodiment. The radio communication system 100 includes a terminal apparatus 10, multiple RRHs (radio apparatuses) 20-1 and 20-2, and a BBU (signal processing apparatus) 30. It is to be noted that in the following description, when making no particular distinction between the RRHs 20-1 and 20-2, they will be described as RRHs 20. The RRHs 20 and the BBU 30 function as a base station. The RRHs 20-1 and 20-2 and the BBU 30 are communicably connected by wire (for example, optical fiber or coaxial cable). Since the RRHs 20-1 and 20-2 have similar structures, the RRH 20-1 will be explained as an example.

The RRH 20-1 includes an RF reception unit 201-1, a channel estimation unit 202-1, a demodulation unit 203-1, a decoding unit 204-1, and a transmission control unit 205-1.

The RF reception unit 201-1 receives signals (radio signals) transmitted from the terminal apparatus 10. Of the received signals, the RF reception unit 201-1 outputs reference signals to the channel estimation unit 202-1, and outputs data signals to the demodulation unit 203-1.

The channel estimation unit 202-1 takes, as inputs, the reference signals output from the RF reception unit 201-1. The channel estimation unit 202-1 estimates the channel information and measures the reception quality on the radio transmission path on the basis of the input reference signals. The channel estimation unit 202-1 outputs the estimated channel information result and the reception quality measurement result to the demodulation unit 203-1.

The demodulation unit 203-1 takes, as inputs, the data signals output from the RF reception unit 201-1 and the channel information estimation result and the reception quality measurement result output from the channel estimation unit 202-1. The demodulation unit 203-1 uses the input channel information estimation result and reception quality measurement result to obtain LLR values (soft decision values) by performing equalization and soft-decision demodulation on the input data signals. The demodulation unit 203-1 outputs the obtained LLR values (soft decision values) and the reception quality measurement result to the decoding unit 204-1.

The decoding unit 204-1 takes, as inputs, the LLR values (soft decision values) and the reception quality measurement result output from the demodulation unit 203-1. The decoding unit 204-1 restores bit data by decoding the input LLR values. It is to be noted that during the decoding process in the decoding unit 204-1, an error detection code called a CRC is used to determine whether or not the decoded bit data includes an error. The decoding unit 204-1 outputs, to the transmission control unit 205-1, the CRC result indicating whether or not the restored bit data includes an error, the restored bit data, and the reception quality measurement result.

The transmission control unit 205-1 takes, as inputs, the CRC result, the restored bit data, and the reception quality measurement result output from the decoding unit 204-1. The transmission control unit 205-1 controls the transmission of the bit data in accordance with the input CRC result. Specifically, if the CRC result indicates that there is no error, then the transmission control unit 205-1 transmits the bit data and the reception quality measurement result to the BBU 30. On the other hand, if the CRC result indicates that there is an error, then the transmission control unit 205-1 discards the bit data and the reception quality measurement result.

If, as shown in FIG. 1, the decoding unit 204-1 in the RRH 20-1 outputs, to the transmission control unit 205-1, a CRC result indicating that there is no error, and the decoding unit 204-2 in the RRH 20-2 outputs, to the transmission control unit 205-2, a CRC result indicating that there is an error, then the transmission control unit 205-1 in the RRH 20-1 transmits, to the BBU 30, the bit data and the reception quality measurement result output from the decoding unit 204-1, and the transmission control unit 205-2 in the RRH 20-2 discards the bit data and the reception quality measurement result output from the decoding unit 204-2.

Figure 2:
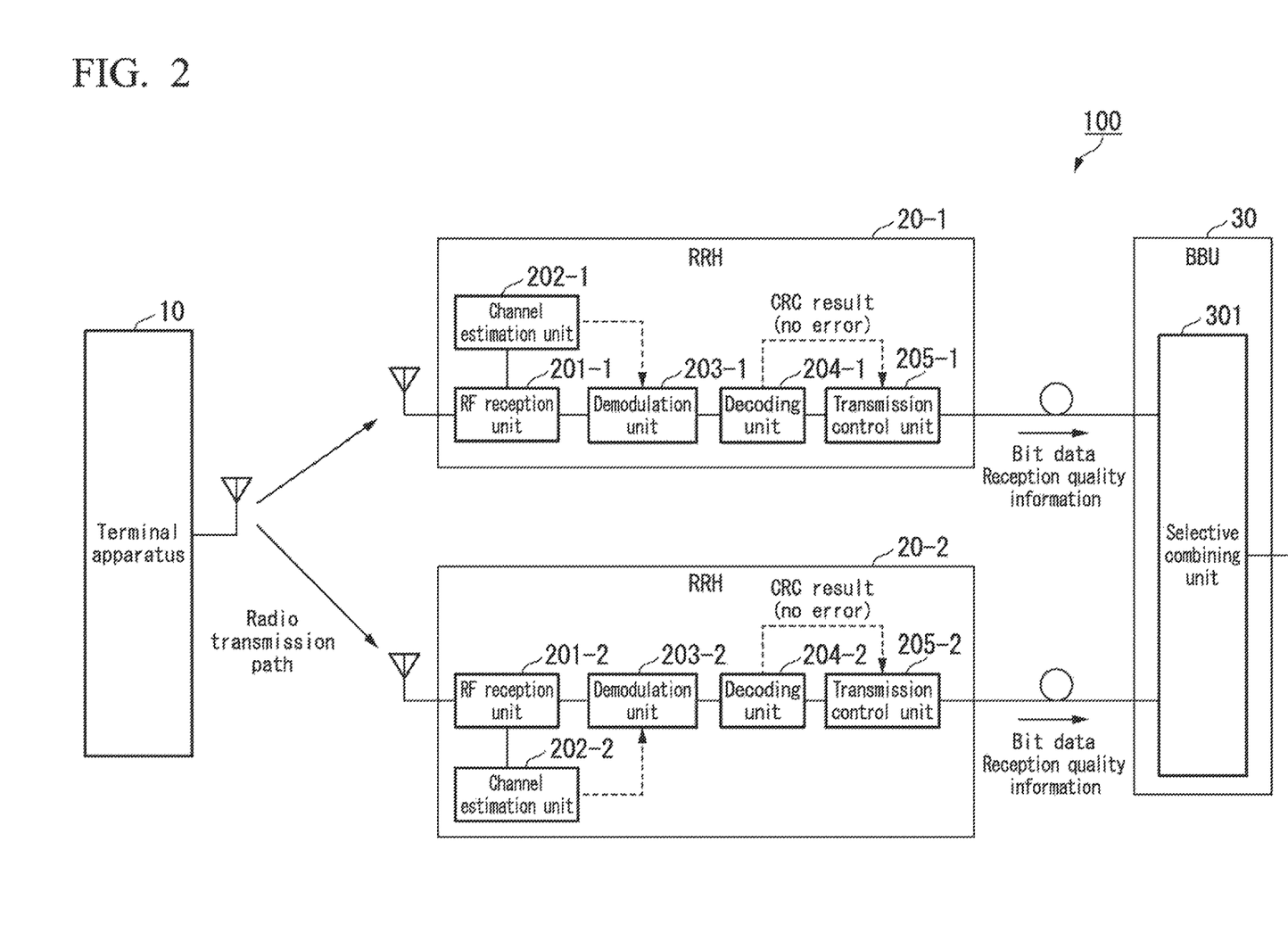
FIG. 2 is a configuration diagram showing the system configuration of the radio communication system 100 according to the first embodiment.

Additionally, if, as shown in FIG. 2, the decoding unit 204-1 in the RRH 20-1 outputs, to the transmission control unit 205-1, a CRC result indicating that there is no error, and the decoding unit 204-2 in the RRH 20-2 outputs, to the transmission control unit 205-2, a CRC result indicating that there is no error, then the transmission control unit 205-1 in the RRH 20-1 transmits, to the BBU 30, the bit data and the reception quality measurement result output from the decoding unit 204-1, and the transmission control unit 205-2 in the RRH 20-2 transmits, to the BBU 30, the bit data and the reception quality measurement result output from the decoding unit 204-2.

The BBU 30 includes a selective combining unit 301. The selective combining unit 301 receives the bit data and the reception quality measurement results transmitted from the RRHs 20. The selective combining unit 301 selects a single set of bit data from among the received bit data. Specifically, if a single set of bit data has been received (the case of FIG. 1), then the selective combining unit 301 selects the received bit data. On the other hand, if multiple sets of bit data have been received (the case of FIG. 2), then the selective combining unit 301 selects one of the multiple sets of bit data in accordance with predetermined conditions. For example, the selective combining unit 301 selects one arbitrary set of bit data from among the received bit data, and discards the other sets of bit data. In this case, the method for selecting one arbitrary set of bit data may involve the selective combining unit 301, for example, comparing reception quality measurement results (reception quality information) and selecting the bit data having the higher reception quality.

With the radio communication system 100 configured in the above manner, in an RRH 20, a determination is made as to whether or not bit data will be transmitted to the BBU 30 depending on whether or not there is an error in the bit data. Furthermore, only bit data not including an error is transmitted from the RRH 20 to the BBU 30. Therefore, unnecessary bit data is not transmitted to the BBU 30. For this reason, it becomes possible to reduce the total transmission data volume between the multiple RRHs 20 and the BBU 30.

Second Embodiment

Figure 3:
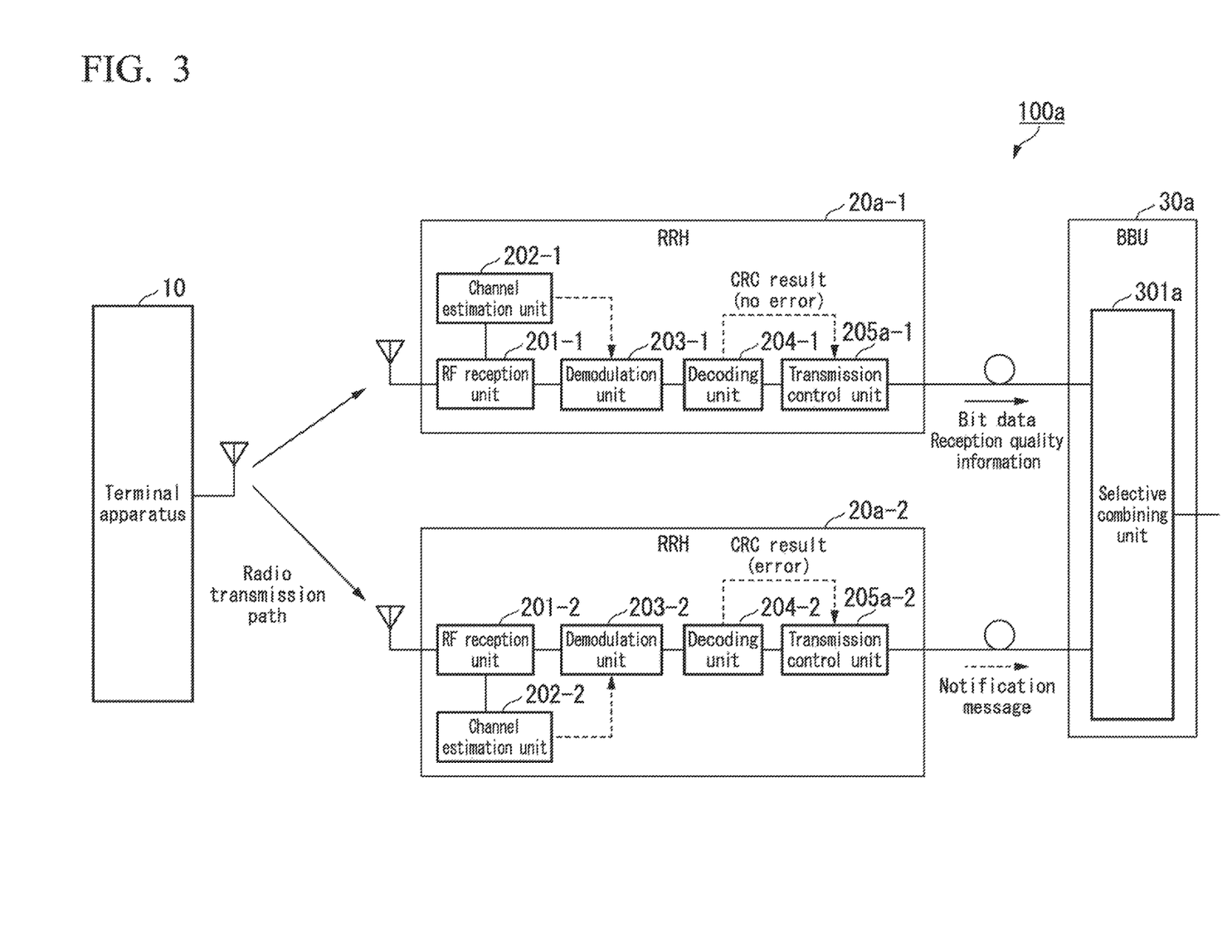
FIG. 3 is a configuration diagram showing the system configuration of a radio communication system 100a according to a second embodiment.

FIG. 3 is a configuration diagram showing a system configuration of a radio communication system 100a according to the second embodiment. The radio communication system 100a includes a terminal apparatus 10, multiple RRHs 20a-1 and 20a-2, and a BBU 30a. It is to be noted that in the following description, when making no particular distinction between the RRHs 20a-1 and 20a-2, they will be described as RRHs 20a. The RRHs 20a and the BBU 30a function as a base station. The RRHs 20a-1 and 20a-2 and the BBU 30a are communicably connected by wire (for example, optical fiber or coaxial cable). Since the RRHs 20a-1 and 20a-2 have similar structures, the RRH 20a-1 will be explained as an example.

The RRH 20a-1 includes an RF reception unit 201-1, a channel estimation unit 202-1, a demodulation unit 203-1, a decoding unit 204-1, and a transmission control unit 205a-1.

The structure of the RRH 20a-1 differs from that of the RRH 20-1 in that a transmission control unit 205a-1 is provided instead of the transmission control unit 205-1. The structure of the RRH 20a-1 is otherwise the same as that of the RRH 20-1. For this reason, the description of the RRH 20a-1 overall will be omitted, and the transmission control unit 205a-1 will be described.

The transmission control unit 205a-1 takes, as inputs, the CRC result, the restored bit data, and the reception quality measurement result output from the decoding unit 204-1. The transmission control unit 205a-1 controls the transmission of the bit data depending on the input CRC result. Specifically, if the CRC result indicates that there is no error, then the transmission control unit 205a-1 transmits the bit data and the reception quality measurement result to the BBU 30a. On the other hand, if the CRC result indicates that there is an error, then the transmission control unit 205a-1 discards the bit data and the reception quality measurement result, and also generates a notification message indicating that the bit data and the reception quality measurement result will not be transmitted, and transmits the generated notification message to the BBU 30a.

If, as shown in FIG. 3, the decoding unit 204-1 in the RRH 20a-1 outputs, to the transmission control unit 205a-1, a CRC result indicating that there is no error, and the decoding unit 204-2 in the RRH 20a-2 outputs, to the transmission control unit 205a-2, a CRC result indicating that there is an error, then the transmission control unit 205a-1 in the RRH 20a-1 transmits, to the BBU 30a, the bit data and the reception quality measurement result output from the decoding unit 204-1, and the transmission control unit 205a-2 in the RRH 20a-2 discards the bit data and the reception quality measurement result output from the decoding unit 204-2, and also generates a notification message and transmits the generated notification message to the BBU 30a.

The BBU 30a includes a selective combining unit 301a. The selective combining unit 301a receives the bit data and the reception quality measurement results transmitted from the RRHs 20a. The selective combining unit 301a receives the bit data transmitted from the RRHs 20a and selects one set of bit data from among the received bit data. Specifically, if there is just a single set of received bit data, then the selective combining unit 301a selects the received bit data. On the other hand, if there are multiple sets of received bit data, then the selective combining unit 301a selects one arbitrary set of bit data from among the received bit data, and discards the other sets of bit data. Additionally, the selective combining unit 301a receives notification messages transmitted from the RRHs 20a.

With the radio communication system 100a configured in the above manner, it is possible to obtain advantageous effects similar to those of the first embodiment.

Additionally, with the radio communication system 100a, the RRHs 20a that have determined that there is an error in the bit data transmit, to the BBU 30a, notification messages indicating that the bit data and the reception quality measurement results will not be transmitted. As a result thereof, the BBU 30a can recognize whether or not information has been received from all of the cooperating RRHs 20a, thereby allowing for a reduction in the time spent in waiting for reception.

Third Embodiment

In the first embodiment, a configuration in which, if the selective combining unit 301 receives multiple sets of bit data, one arbitrary set of bit data is selected (for example, on the basis of reception quality information) from among the multiple received sets of bit data was described. In the third embodiment, if the selective combining unit 301 receives multiple sets of bit data, then the first-received set of bit data is selected from among the multiple sets of bit data, and the other sets of bit data are discarded. In the third embodiment, the structure is otherwise the same as that of the first embodiment.

With the radio communication system 100 according to the third embodiment configured in the above manner, it is possible to obtain advantageous effects similar to those of the first embodiment.

Fourth Embodiment

In the second embodiment, a configuration in which, if the selective combining unit 301a receives multiple sets of bit data, one arbitrary set of bit data is selected (for example, on the basis of reception quality information) from among the multiple received sets of bit data was described. In the fourth embodiment, if the selective combining unit 301a receives multiple sets of bit data, the first-received set of bit data is selected from among the multiple sets of bit data, and the other sets of bit data are discarded. In the fourth embodiment, the structure is otherwise the same as that of the second embodiment.

With the radio communication system 100a according to the fourth embodiment configured in the above manner, it is possible to obtain advantageous effects similar to those of the second embodiment.

Fifth Embodiment

Figure 4:
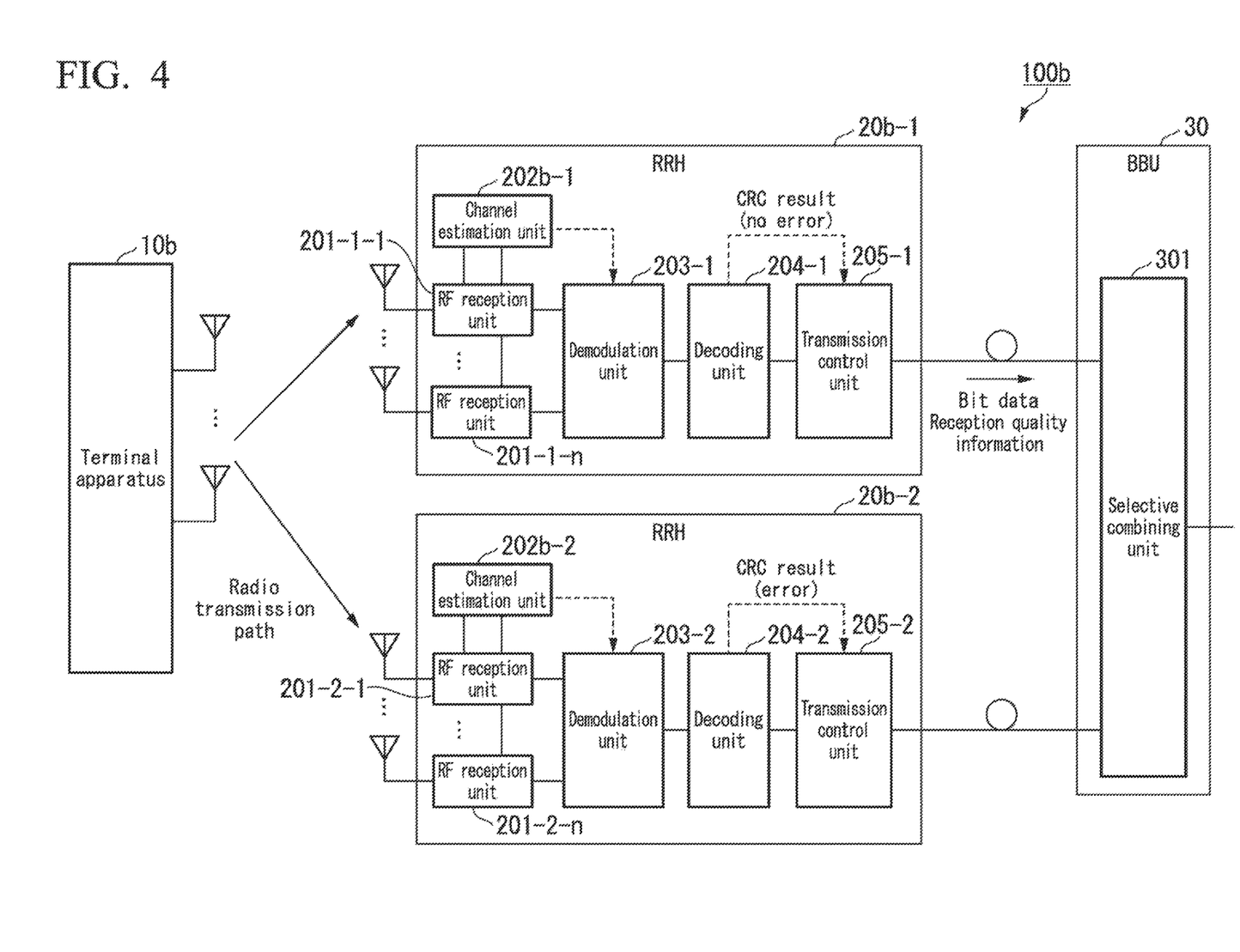
FIG. 4 is a configuration diagram showing the system configuration of a radio communication system 100b according to a fifth embodiment.

FIG. 4 is a configuration diagram showing a system configuration of a radio communication system 100b according to the fifth embodiment. The radio communication system 100b includes a terminal apparatus 10b, multiple RRHs 20b-1 and 20b-2, and a BBU 30.

In the fifth embodiment, the terminal apparatus 10b and the RRHs 20b are provided with multiple antennas, and MIMO (Multiple-Input Multiple-Output) transmissions are performed between the terminal apparatus 10b and the RRHs 20b. When the radio communication system 100b is configured in this manner, the RRH 20b-1 includes multiple RF reception units 201-1-1 to 201-1-n (where n is an integer greater than or equal to 2), a channel estimation unit 202b-1, a demodulation unit 203-1, a decoding unit 204-1, and a transmission control unit 205-1.

Each of the multiple RF reception units 201-1-1 to 201-1-n is connected to one channel estimation unit 202b-1. The channel estimation unit 202b-1 estimates the channel information and measures the reception quality on the radio transmission path for the signals received by each of the RF reception units 201-1-1 to 201-1-n. It is to be noted that the channel estimation unit 202b-1 may calculate a total reception quality measurement result and output the calculated total received reception quality measurement result to the demodulation unit 203-1, or may output the average received reception quality measurement result to the demodulation unit 203-1. The operations in the demodulation unit 203-1, the decoding unit 204-1, and the transmission control unit 205-1 are similar to those in the functional units having the same names in the first embodiment.

With the radio communication system 100b configured in the above manner, it is possible to obtain advantageous effects similar to those of the first embodiment.

Additionally, with the radio communication system 100b, it becomes possible to reduce the transmission data volume between the RRHs 20b and the BBU 30 even for MIMO transmission.

Sixth Embodiment

In the sixth embodiment, the terminal apparatus 10 and the RRHs 20a according to the second embodiment are provided with multiple antennas, and MIMO transmissions are performed between the terminal apparatus 10 and the RRHs 20a. When the radio communication system 100a is configured in this manner, the RRHs 20a differ from the RRHs 20a in the second embodiment in that multiple RF reception units 201 are provided. The structure is otherwise the same as that of the RRHs 20a in the second embodiment. Additionally, the terminal apparatus 10 and the BBU 30a perform the same processes as the terminal apparatus 10 and the BBU 30a in the second embodiment.

With the radio communication system 100a according to the sixth embodiment configured in the above manner, it is possible to obtain advantageous effects similar to those of the second embodiment.

Additionally, with the radio communication system 100a according to the sixth embodiment, it becomes possible to reduce the transmission data volume between the RRHs 20a and the BBU 30 even for MIMO transmission.

Seventh Embodiment

In the seventh embodiment, the terminal apparatus 10 and the RRHs 20 according to the third embodiment are provided with multiple antennas, and MIMO transmissions are performed between the terminal apparatus 10 and the RRHs 20. When the radio communication system 100 is configured in this manner, the RRHs 20 differ from the RRHs 20 in the third embodiment in that multiple RF reception units 201 are provided. The structure is otherwise the same as that of the RRHs 20 in the third embodiment. Additionally, the terminal apparatus 10 and the BBU 30 perform the same processes as the terminal apparatus 10 and the BBU 30 in the third embodiment.

With the radio communication system 100 according to the seventh embodiment configured in the above manner, it is possible to obtain advantageous effects similar to those of the third embodiment.

Additionally, with the radio communication system 100 according to the seventh embodiment, it becomes possible to reduce the transmission data volume between the RRHs 20 and the BBU 30 even for MIMO transmission.

Eighth Embodiment

In the eighth embodiment, the terminal apparatus 10 and the RRHs 20a according to the fourth embodiment are provided with multiple antennas, and MIMO transmissions are performed between the terminal apparatus 10 and the RRHs 20a. When the radio communication system 100a is configured in this manner, the RRHs 20a differ from the RRHs 20a in the fourth embodiment in that multiple RF reception units 201 are provided. The structure is otherwise the same as that of the RRHs 20a in the fourth embodiment. Additionally, the terminal apparatus 10 and the BBU 30a perform the same processes as the terminal apparatus 10 and the BBU 30a in the fourth embodiment.

With the radio communication system 100a according to the eighth embodiment configured in the above manner, it is possible to obtain advantageous effects similar to those of the fourth embodiment.

Additionally, with the radio communication system 100a according to the eighth embodiment, it becomes possible to reduce the transmission data volume between the RRHs 20a and the BBU 30a even for MIMO transmission.

Hereinbelow, examples of modifications that are common to all of the embodiments will be explained. Although the RRHs 20 and BBU 30 of the first embodiment will be described as an example here, the RRHs 20 may be replaced with the RRHs 20a or the RRHs 20b, and the BBU 30 may be replaced with the BBU 30a.

In each of the above-described embodiments, it is possible for there to be multiple terminal apparatuses 10. Additionally, it is possible for there to be three or more RRHs 20.

The RRHs 20 and the BBU 30 need not be limited to being connected by a point-to-point connection, and they may be networked.

The BBU 30 may be configured so as to transmit, to all cooperating RRHs 20, a message providing notification that reception has been completed when the signals (for example, bit data and reception quality information, or a notification message) received from one of the RRHs 20 have been received without error.

All or some of the RRHs 20, the RRHs 20a, and the RRHs 20b, and the BBU 30 and the BBU 30a in the aforementioned embodiments may be realized in a computer. For example, it is possible to realize the RRHs and the BBU by recording programs for respectively realizing the constituent elements of the RRHs and the BBU in computer-readable recording media, loading the programs recorded on these recording media in a computer system, and running the programs. It is to be noted that the "computer system" mentioned here includes OSs (Operating Systems) and hardware such as peripheral devices. Additionally, the "computer-readable recording media" refer to portable media such as flexible disks, magneto-optic disks, ROM (Read-Only Memory) and CD (Compact Disc)-ROMs, and also to storage apparatuses, such as hard disks, installed internally in the computer system. Furthermore, the "computer-readable recording media" may include those that dynamically hold the programs for a short time, such as communication cables when the programs are transmitted over a network such as the internet or over a communication line such as a telephone line, and in this case, they may include those that hold the programs for a certain period of time, such as volatile memories inside a computer system used as a server or a client. Additionally, these programs may be for the purpose of realizing some of the aforementioned constituent elements, and furthermore, the aforementioned constituent elements may be able to be realized by being combined with programs that are already recorded in the computer system, or may be realized by using hardware such as PLDs (Programmable Logic Devices) or FPGAs (Field Programmable Gate Arrays).

As described above, embodiments of the present invention have been explained in detail by referring to the drawings, but the specific structures are not limited to those in these embodiments, and designs and the like within a range not departing from the gist of the present invention are included.

INDUSTRIAL APPLICABILITY

The present invention is applicable, for example, to radio communications. With the present invention, it is possible to reduce the transmission data volume between multiple RRHs and a BBU.

DESCRIPTION OF REFERENCE SYMBOLS 10, 10b, 91 . . . terminal apparatus
20, 20-1, 20-2, 20a, 20a-1, 20a-2, 20b, 20b-1, 20b-2, 92-1, 92-2 . . . RRH
30, 30a, 93 . . . BBU
201-1, 201-2, 201-1-1 to 201-1-n, 201-2-1 to 201-2-n, 921-1, 921-2 . . . RF reception unit
202-1, 202-2, 202b-1, 202b-2, 922-1, 922-2 . . . channel estimation unit
203-1, 203-2, 923-1, 923-2 . . . demodulation unit
204-1, 204-2, 924-1, 924-2 . . . decoding unit
205-1, 205-2, 205a-1, 205a-2 . . . transmission control unit
301, 301a . . . selective combining unit

The invention claimed is:

1. A radio communication system comprising a radio apparatus and a signal processing apparatus that function as a base station,
the radio apparatus comprising:
a channel estimation unit that, on the basis of a radio signal transmitted from a terminal apparatus, estimates channel information relating to a radio transmission path between the radio apparatus and the terminal apparatus;
a demodulation unit that performs soft-decision demodulation of the radio signal on the basis of the channel information estimated by the channel estimation unit;
a decoding unit that decodes a log likelihood ratio obtained by the soft-decision demodulation and outputs a result of an error detection code obtained by the decoding; and
a transmission control unit that, on the basis of the result of the error detection code, controls transmission, to the signal processing apparatus, of data obtained by the decoding,
the signal processing apparatus comprising a selective combining unit that receives the data transmitted from the radio apparatus, and when a single set of data has been received, selects the data, and when multiple sets of data have been received, selects one of the multiple sets of data in accordance with predetermined conditions.

2. The radio communication system according to claim 1, wherein the transmission control unit, when the result of the error detection code indicates that there is an error, discards the data without transmission to the signal processing apparatus, and when the result of the error detection code indicates that there is no error, transmits the data to the signal processing apparatus.

3. The radio communication system according to claim 2, wherein the transmission control unit, when the result of the error detection code indicates that there is an error, discards the data without transmission to the signal processing apparatus, and notifies the signal processing apparatus that the data will not be transmitted to the signal processing apparatus.

4. The radio communication system according to claim 2, wherein the selective combining unit, when multiple sets of data have been received, selects the first-received set of data and discards the other sets of data.

5. The radio communication system according to claim 1, wherein the transmission control unit, when the result of the error detection code indicates that there is an error, discards the data without transmission to the signal processing apparatus, and notifies the signal processing apparatus that the data will not be transmitted to the signal processing apparatus.

6. The radio communication system according to claim 1, wherein the selective combining unit, when multiple sets of data have been received, selects the first-received set of data and discards the other sets of data.

7. A radio communication method in a radio communication system comprising a radio apparatus and a signal processing apparatus that function as a base station, the radio communication method comprising:
a channel estimation step wherein the radio apparatus, on the basis of a radio signal transmitted from a terminal apparatus, estimates channel information relating to a radio transmission path between the radio apparatus and the terminal apparatus;
a demodulation step wherein the radio apparatus performs soft-decision demodulation of the radio signal on the basis of the channel information estimated in the channel estimation step;
a decoding step wherein the radio apparatus decodes a log likelihood ratio obtained by the soft-decision demodulation and outputs a result of an error detection code obtained by the decoding;
a transmission control step wherein the radio apparatus, on the basis of the result of the error detection code, controls transmission, to the signal processing apparatus, of data obtained by the decoding; and
a selective combining step wherein the signal processing apparatus receives the data transmitted from the radio apparatus, and when a single set of data has been received, selects the data, and when multiple sets of data have been received, selects one of the multiple sets of data in accordance with predetermined conditions.

* * * * *